May 19, 1942.  C. J. CRANE  2,283,190

FLIGHT INDICATOR

Filed May 18, 1940  4 Sheets-Sheet 1

INVENTOR
CARL J. CRANE
By Elgin H. Snodgrass
Wade Koontz
ATTORNEYS

May 19, 1942.  C. J. CRANE  2,283,190
FLIGHT INDICATOR
Filed May 18, 1940  4 Sheets-Sheet 2

INVENTOR
CARL J. CRANE
BY
ATTORNEYS

May 19, 1942.          C. J. CRANE            2,283,190
                      FLIGHT INDICATOR
              Filed May 18, 1940        4 Sheets-Sheet 3
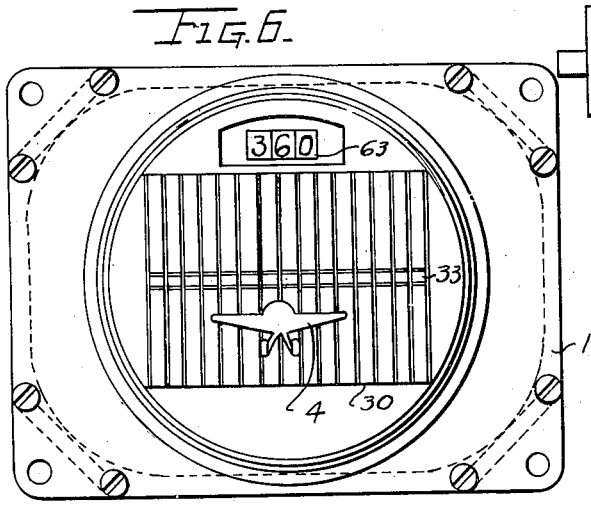
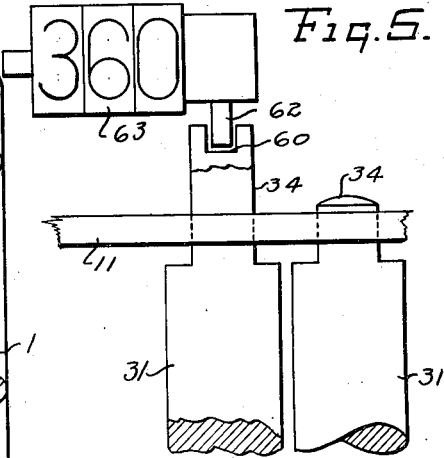
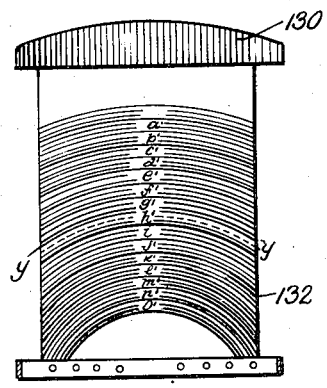
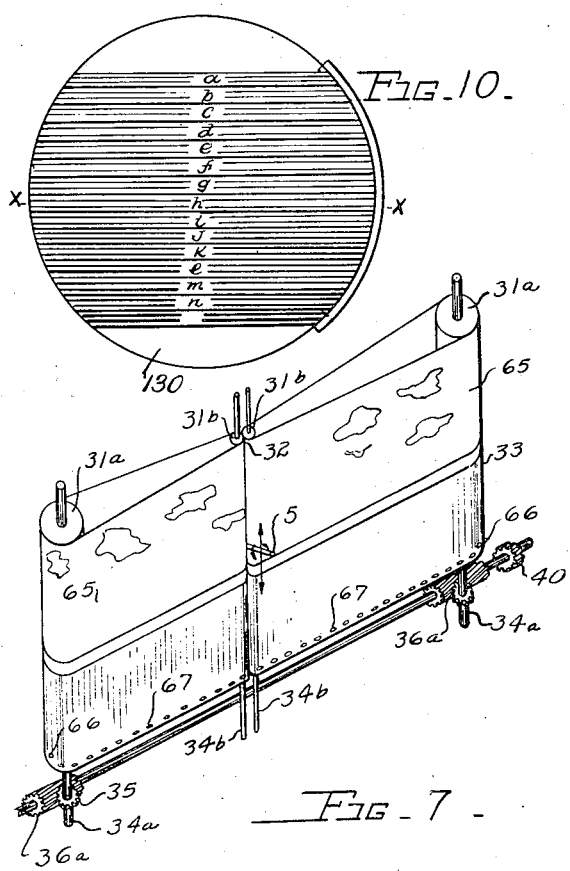
INVENTOR
CARL J. CRANE
ATTORNEYS

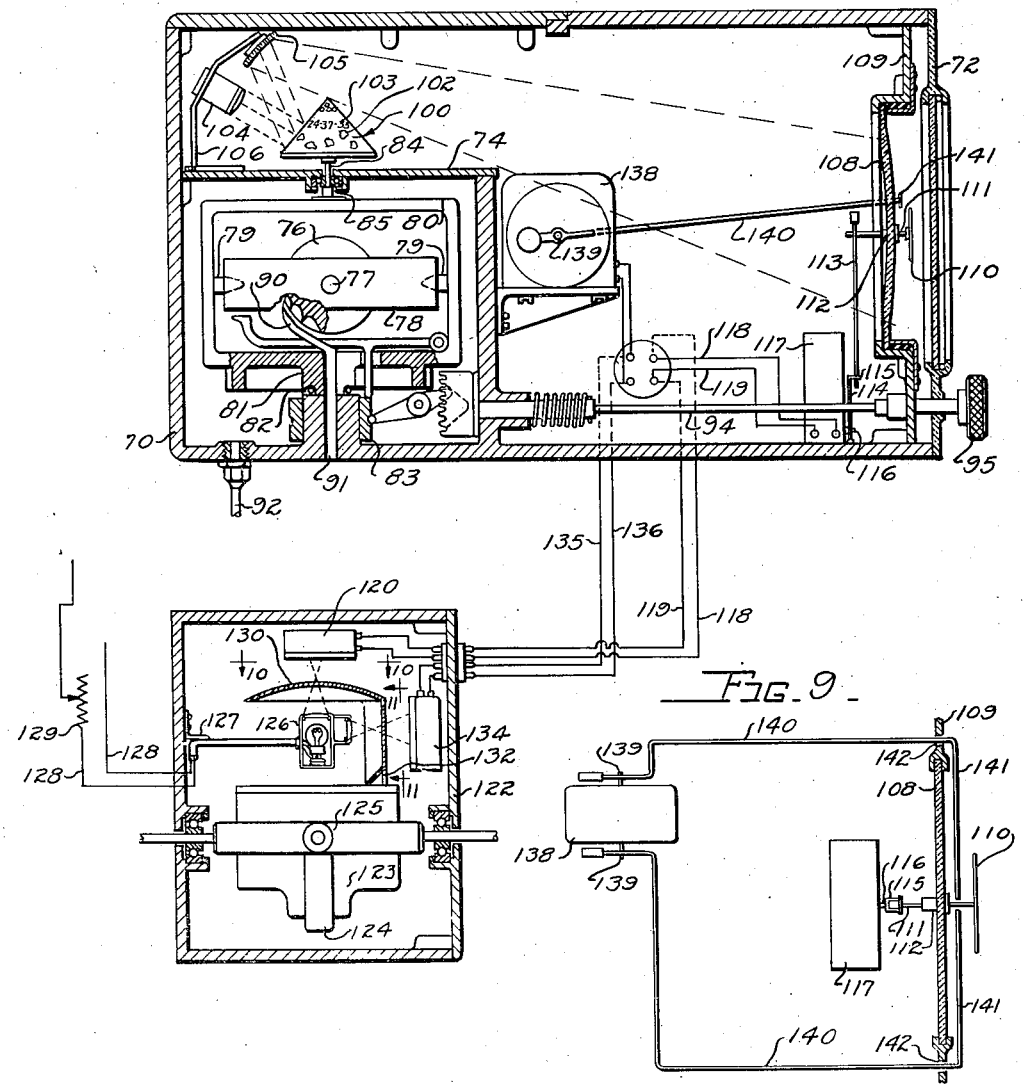

Patented May 19, 1942

2,283,190

UNITED STATES PATENT OFFICE 2,283,190

FLIGHT INDICATOR

Carl J. Crane, Dayton, Ohio

Application May 18, 1940, Serial No. 335,955

7 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft instruments, and more particularly to a flight indicator, for visually indicating the pitch, turn, and bank of an aircraft in flight, and is designed to be an aid in facilitating the proper control and flight of an aircraft by "blind" or "instrument" flying.

The present invention is an improvement over the devices disclosed in United States Patents No. 2,053,182 and No. 2,053,183, granted to myself and to William C. Ocker, relating to "blind" flying instruments, in which an artificial field of view is provided, simulating the normal visual reference of the ground, sky, and horizon and comprising a colored screen in the form of an endless belt which is moved relative to an indicator representing the aircraft, in response to turning of the aircraft. The horizontal is simulated by a horizontal bar movable relative to the screen and the indicator, in response to the climbing or descending attitude of the aircraft. The indicator is operated so as to tilt relative to the horizon to indicate bank of the aircraft and controlled by a gyroscopic device in accordance with the bank of the aircraft. The above-described patented devices satisfactorily serve as an artificial reference and to a great extent eliminate the vertigo experienced by all pilots attempting to coordinate their sense impressions with the indications given by ordinary flight instruments used in blind flying, due to the absence of any external reference with which the pilot may orientate the aircraft.

The above-described patented devices, however, have the disadvantage that the mechanism required to actuate the indicator elements amounts to a duplication of other instruments already on the aircraft, and hence the weight of the flight indicators becomes excessive, and further, the index, or indicating element, requires movement-transmitting mechanism in front of the moving screen, thus partially distracting attention from the moving screen, which primarily is responsible for relieving the vertigo due to turns, by giving the pilot a correct stimulus in turning.

Due to space limitations on present aircraft instrument boards, the size of a flight indicator is accordingly limited, which in turn determines the size of the visual screen; and the problem of keeping the ratio of the area of the screen to the area of the index indicator and obstructions as large as possible, becomes serious.

A solution to the above problem and the principal object of the invention is attained by the provision, in combination with the moving screen or a means to create the optical illusion of motion thereof, of a means to actuate the indicator, or index, by means placed in the rear of the screen, and thus for any particular size of screen, achieving a maximum value of the above-noted ratio. This novel concept is, so far as I am aware, not present in any of the known prior art devices.

The invention further has for its object, in an indicator of the type described, a novel arrangement of the movable screen either in the form of a plurality of belts separated by a space sufficient to permit the operating shaft for the index or indicator to extend therethrough for rotation and vertical displacement, or in the form of a plurality of parallel rollers rotated about their axes in response to turn of the aircraft and operative, due to an optical illusion, to create the same visual effect as a moving screen, and a space provided between two adjacent rollers for passage of the index-operating shaft therethrough, the shaft being capable of rotation as well as vertical displacement.

The invention further has for its object the provision, in a flight indicator of the character described, of a stationary screen and an optical means to create the illusion of motion of the screen in response to turning of the aircraft. This arrangement also permits actuation of the index element by elements behind the screen.

The invention further has for its object a novel means for transmitting motion from existing aircraft instruments to the flight indicator by photoelectric means, thus not imposing load on the primary instrument so as to in any way affect its indication.

Other objects and features of novelty not specifically enumerated above will become apparent by reference to the following specification and drawings, in which:

Fig. 5 represents a modified azimuth-indicating means for use in the device of Fig. 1;

Fig. 6 is a front elevation of the device of Fig. 1 employing the azimuth indicator of Fig. 5;

Fig. 7 is a modified form of screen for use with a device of the type of Fig. 1;

Fig. 8 is a view, partly in section, illustrating a modified form of flight indicator employing optical means to cause the illusion of motion of the reference screen;

Fig. 9 is a plan view of the arrangement of some of the details of the device of Fig. 8;

Fig. 10 is a plan view of a translucent screen taken on line 10—10 of Fig. 8; and Fig. 11 is an elevation of a translucent screen taken on line 11—11 of Fig. 8.

Figure 1:
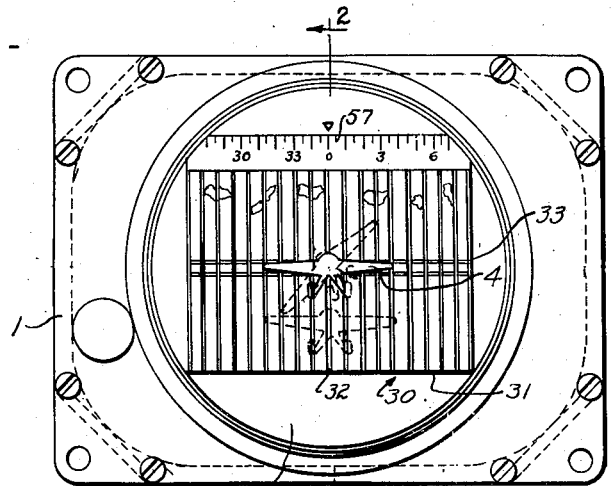
Fig. 1 is a front elevation of one form of flight indicator according to the invention.

Referring now to Figs. 1 to 4 inclusive, the reference numeral 1 indicates the instrument casing, which is provided at one end with a cover glass 2, through which a small index element 4, in the form of a thin piece of metal shaped to have the pictorial outline of an airplane, is observable. The index 4 is mounted on the outer end of a very small-diametered shaft 5, and the index 4 may be tilted by the shaft 5 into an attitude indicative of the bank of an aircraft. The index 4 and its actuating shaft 5 are arranged so that the index may be shifted in a vertical plane above and below a horizon reference line on a background generally indicated by the reference numeral 30. Means hereinafter described are provided for causing the background, which is colored above the horizon to imitate the sky and colored below the horizon to imitate the ground, to appear to move relative to the index to give a visual representation of a turn, similar to the visual stimulus received when making a turn in an airplane and using the sky, ground, and horizon as an external reference.

Figure 4:
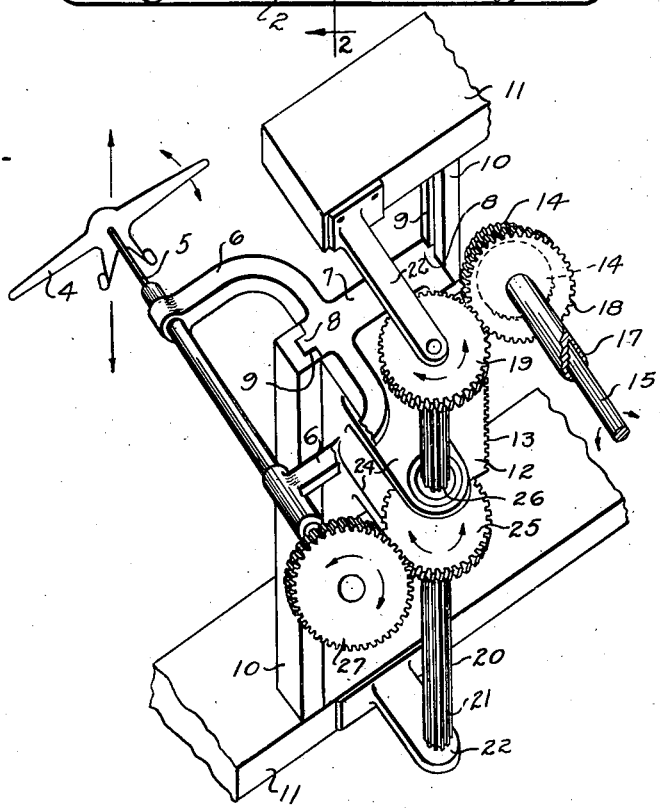
Fig. 4 is an isometric view to an enlarged scale of the airplane index-operating mechanism.
Figure 3:
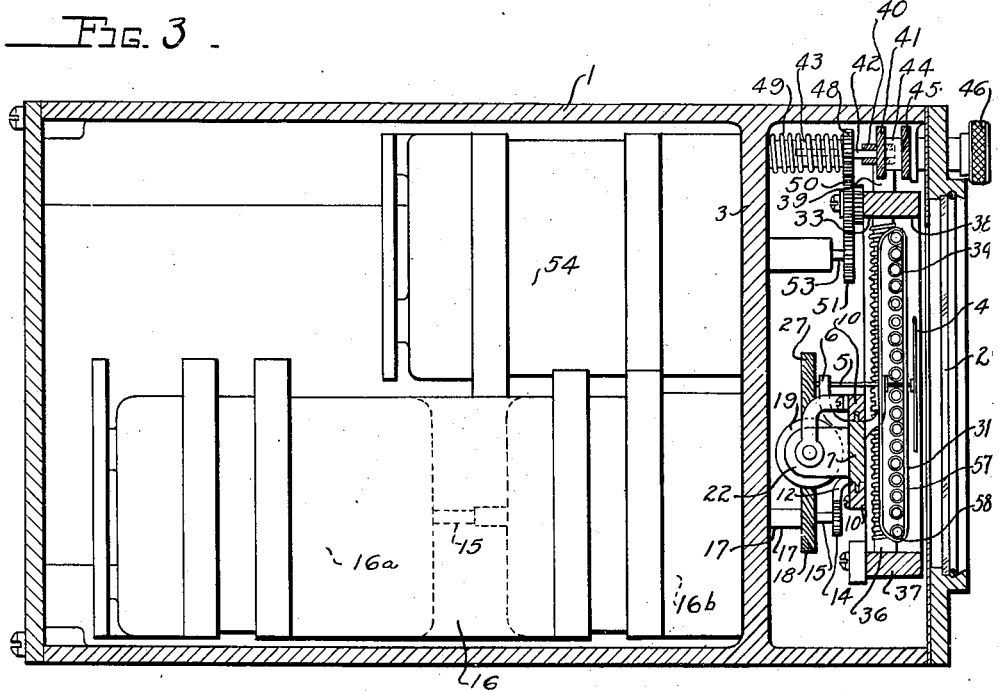
Fig. 3 is a view, partly in section, taken on line 3—3 of Fig. 2.
Figure 2:
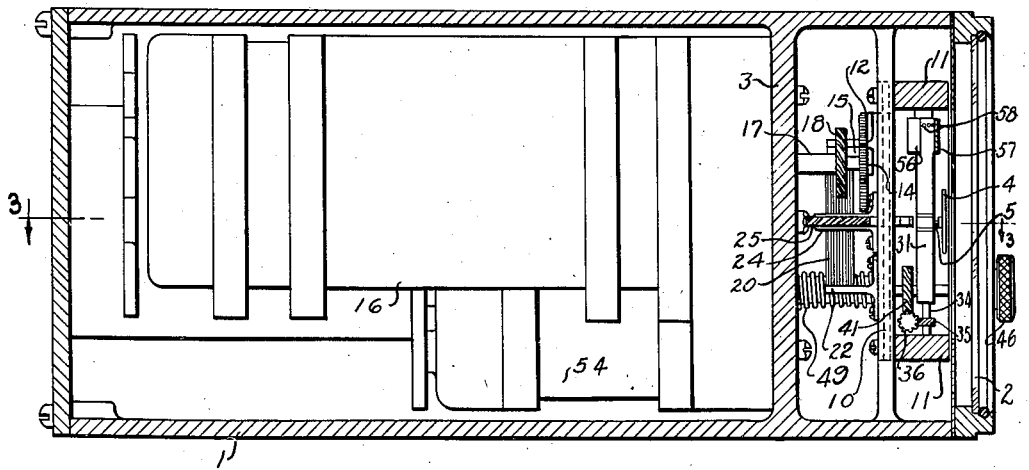
Fig. 2 is a view, partly in section, taken on line 2—2 of Fig. 1.

As seen in Figs. 2, 3, and 4, the shaft 5 of the index 4 is rotatably mounted in a pair of arms 6 which are arranged in the form of a fork and formed as a part of a guide block 7, which has tongues 8, which extend into the grooves 9 of the spaced vertical guides 10, so that the guide block is reciprocable in a vertical plane similar to the familiar engine crosshead. The vertical guides 10 are secured at each end to the transverse supporting members 11, which are suitably secured at their ends to lugs formed in the instrument casing. An L-shaped rack member 12 extends from the guide block 7 and has rack teeth 13 cut in the edge thereof, which mesh with a pinion gear 14 mounted on the end of a shaft 15, which is actuated by one of the receiver units 16a of a tandem type "Autosyn" or "Selsyn" electrical-motion-transmission receiver or motor 16 mounted in the instrument casing 1. Rotation of the shaft 15 in either direction will cause the gear 14 to move the rack 12 and the block 7 up or down in the guides 10, thus moving the shaft 5 and the airplane index 4 in a vertical plane, as indicated by the arrows in Fig. 4.

A hollow shaft 17, which surrounds and is concentric with the shaft 15, is actuated by a second receiver unit 16b of the tandem receiver 16, and a spiral tooth gear 18 is mounted on the outer end of the hollow shaft 17 and may be actuated in either direction of rotation by the shaft 17. Th gear 18 meshes with a corresponding spiral tooth gear 19 arranged to rotate in a plane at right angles to the plane of rotation of gear 18. The gear 19 is secured to the upper end of a vertical splined shaft 20, which has a plurality of splines 21 arranged parallel to the longitudinal axis of the shaft and formed on the exterior surface of the shaft. The splined shaft 20 is journalled for rotation in bearings carried by the parallel arms 22, which extend rearward and are respectively secured to the transverse supports 11, the longitudinal axis of the splined shaft 20 being parallel to the vertical guides 10.

The guide block 7 is provided with a pair of rearwardly extending parallel spaced bearing supports 24, which serve as bearings for a spiral-tooth gear 25, located between the supports 24 and arranged perpendicular to and concentric with the longitudinal axis of the splined shaft 20. The gear 25 is provided with an internally splined bore 26 (see Fig. 4) which cooperates with the splines 21 on the vertical shaft 20, so that the gear 25 is freely slidable along the shaft but nonrotatable with respect thereto. The gear 25, being carried by the guide block 7, is reciprocable therewith. The spiral-tooth gear 25 meshes with a corresponding spiral-tooth gear 27 arranged to rotate in a plane at right angles to the plane of rotation of gear 25 and mounted on the inner end of the index-actuating shaft 5. The supporting bearing arms 6 of the index shaft 5 straddle one of the vertical guides 10 and serve to maintain the index shaft 5 freely rotatable and perpendicular to the plane of the vertical guides 10 and the guide block 7. The gears 25 and 27 are always in mesh and movable in a vertical plane with the guide block 7 without causing rotation of the index shaft 5.

Rotation of the hollow shaft 17 in either direction by the receiver unit 16b of the tandem "Autosyn" receiver 16 causes gear 18 to rotate gear 19 and splined shaft 20 a proportional amount in either direction of rotation of shaft 20. Rotation of the splined shaft 20 in either direction will cause a corresponding rotation of the gear 25, which in turn will correspondingly rotate the gear 27 and the index shaft 5 through an angular amount proportional to or equal to the angular deviation of the shaft 17 and in a direction determined by the arrangement of the spiral-toothed gearing, which is determined such that the airplane index 4 rotates in the same direction as the airplane on which the instrument is mounted, viewed from the pilot's cockpit looking forward; and the outline of the airplane index 4, as seen in Fig. 1, is representative of a view of an airplane looking forward from the tail.

As seen in Fig. 1, the airplane index 4 is located in front of a reference screen assembly, generally indicated by the reference numeral 30, the construction of which will now be described. The screen 30 is formed by a plurality of small parallel vertical rollers 31 arranged so that they are nearly in contact at their adjacent edges, with the exception that a space 32 is left between the center pair of rollers sufficient for the small index-actuating shaft 5 to project therethrough and to be capable of vertical displacement without contacting the rollers. The rollers are painted with a narrow black stripe at their central portions, with a narrow stripe of luminous paint on either side of the black stripe, and the black stripe and the black and luminous stripes on the rollers are aligned to give the appearance of a continuous black horizon line for reference in normal daylight, and a continuous luminous reference horizon line for observation in the dark or in similar lighting conditions. The horizon line is generally indicated by the reference numeral 33. Above the horizon line the rollers are painted blue, with small irregularly spaced white spots, or alternately painted blue and white, while below the horizon line 33 the rollers are painted in a color to resemble the earth, or painted a dull black, or painted alternately black and white. The space on the rollers above the horizon line furnishes a background representing the sky as viewed from the airplane, while the space below the horizon furnishes a background representing the earth's surface, and the horizon line represents the horizon, or line of meeting of earth and sky, as seen from an aircraft and universally used as an external reference in determining the flight attitude of aircraft under conditions of good visibility.

As seen in Figs. 2 and 3, the rollers 31 have reduced-diameter shoulder portions 34 at each end, which are pivotally mounted in suitable bearings in the transverse members 11, and at their lower ends each roller is provided with a small spiral-tooth pinion gear 35, mounted on the reduced-diameter portion and adapted to mesh with the worm 36, which extends transverse of the casing 1 and is rotatably mounted in the vertical supports 37 and 38. As seen in Fig. 3, the worm 36 has a spindle portion 39 at its outer end, which extends beyond the vertical support 38 and has a spiral-tooth gear 40 mounted on the end thereof which may mesh with a spiral-tooth gear 41, mounted on a shaft 42, which is rotatably and slidably supported at one end by bearing boss 43, carried by the transverse wall 3 of the instrument casing 1 and supported at its other end by a manually rotatable and axially slidable sleeve 44, which has a spiral-tooth resetting gear 45 secured thereto and rotatable therewith. The sleeve 44 extends through the front wall of the instrument casing 1, and is capable of being rotated and moved axially by the knob 46. A spur gear 48 is mounted on the shaft 42 in axial spaced relation to the gear 41 and is contacted by a compression spring 49, loosely rotatably mounted on the bearing boss 43. The spring 49 serves to maintain the gears 40 and 41 normally in mesh, but by pushing in the knob 46 the sleeve 44 engages the side of gear 41 and moves the gear and its shaft 42 axially to the left, demeshing gears 40 and 41 and meshing the gear 40 with the resetting gear 45, so that by rotation of the knob 46, the worm 36 and rollers 31 may be manually rotated in either direction to perform a resetting operation hereinafter described. The spur gear 48 on shaft 42 meshes with an idler gear 50 pivotally mounted on the vertical support 38, and the idler gear 50, in turn, meshes with a spur gear 51 secured on the end of a shaft 53 and rotatable therewith. The shaft 53 forms the rotor shaft of a third "Autosyn" receiver 54, which, in rotating in either direction, will cause worm 36 and rollers 31 to rotate a proportional amount. The resetting operation above described causes spur gear 48 on shaft 42 to be demeshed from idler gear 50 and thus from driving connection with the receiver 54.

The "Autosyn" motor, or receiver 54, is adapted to be electrically connected to a corresponding transmitter unit (not shown), which is adapted to be connected to a directional gyro device, preferably the unit provided in the well-known gyro-controlled "automatic pilot." The receiver unit 54 is thus positionally controlled and rotates through an angle equal to or proportional to the azimuth change in heading of the aircraft, and the gearing between the receiver 54 and the screen rollers 31 is arranged so that the rollers rotate in a direction opposite to the direction of the aircraft turn. Adjacent the upper ends of each of the end rollers 31 a semicircular guide 56 is provided to serve as a guide for a narrow endless belt 57 made of flexible material and containing azimuth indicia on its outer surface. The belt 57 passes over the rollers 31, and one of the end rollers is provided with sprocket teeth 58 which engage perforations in the belt 57 and serve to drive the belt; and in addition certain other of the rollers 31 are roughened or serrated at their upper ends, so as to assist in driving the belt 57 and take up slack. The belt 57 and the azimuth indicia thereon pass across the front face of the instrument and are visible through the cover glass 2, as clearly seen in Fig. 1. Since the rollers 31 are rotated by the "Autosyn" receiver 54 and connected gearing, an amount proportional to the degree of turn of the aircraft, the belt 57, or azimuth scale, serves to indicate the degree of angular change in azimuth heading of the aircraft. The azimuth scale, or belt 57, is set to a desired initial setting by means of the resetting knob 46.

As above described, it is seen that the rotation of the shaft 15 of the "Autosyn" receiver 16a of the tandem receiver unit 16, caused the airplane index 4 and its associated shaft 5 to be vertically displaced up or down, depending on the direction of rotation of the shaft 15. The "Autosyn" receiver unit 16a is adapted to be electrically connected to a corresponding "Autosyn" transmitter (not shown), which is connected to a horizontal gyro device (not shown), preferably such as employed in the well-known "automatic pilot" and responsive to changes in pitch of the aircraft—i. e., the climbing or diving attitude of the aircraft with respect to a horizontal plane. The gearing between the "Autosyn" receiver unit 16a and the guide block rack 12 is such that for a movement of the aircraft into a climbing attitude, the guide block 7, index shaft 5, and index 4 will move up to a position above the horizon line 33 on the screen 30 to indicate the magnitude of the angle of climb. If the aircraft assumes a diving attitude, the index 4 will accordingly be moved below the horizon line 33 on the screen 30, to properly indicate a diving condition.

The index 4, as above described, is rotatable by the shaft 5 in response to the angular deviation of the shaft 17, which is the rotor shaft of the "Autosyn" receiver unit 16b of the tandem type "Autosyn" unit 16. The receiver unit 16b is electrically connected to a corresponding "Autosyn" transmitter unit (not shown), which is controlled preferably by the horizontal gyro unit of an "automatic pilot" in response to banking of the aircraft about its longitudinal axis. The shaft 5 then rotates through an angle equal to or proportional to the degree of bank of the airplane, and the miniature airplane index 4 assumes a tilted position relative to the horizon line 33 of the screen 30, indicative of the direction and degree of bank of the aircraft.

*Operation*

In the above-identified Crane and Ocker patents, the concept of causing a reference screen to have a motion of translation relative to the miniature airplane index such that the motion of the screen is to the left when an aircraft on which the instrument is mounted turns to the right, and vice versa, to give a correct visual stimulus representing the making of a turn using an external reference, is disclosed. In the present invention, as illustrated in the device of Figs. 1 to 4, the same result is attained by means of an optical illusion created by the colored rollers 31. The rollers 31, in simultaneously rotating, give the visual effect the same as if a reference screen were given a translatory movement past the airplane index 4, and the direction of rotation of the rollers is arranged such that if the airplane makes a right-hand, or clockwise, turn, the rollers 31 will revolve clockwise and will give the illusion that the background is moving to the left, as seen in Fig. 1; and for a left-hand turn, the direction of rotation of the rollers 31 will be reversed and the background will appear to move to the right, as seen in Fig. 1. The above operation of the rollers and the background created thereby serve to give an artificial reference which gives the correct visual stimulus of the turning of the aircraft, while the azimuth scale gives the change of the azimuth heading in the turn.

When the aircraft makes a correct banked turn to the right and maintains the level flight position, the miniature airplane index 4, as seen in Fig. 1, will tilt in a clockwise direction to indicate the degree of bank; and the shaft 5 will be in the plane of the horizon index line 33 on the rollers 31. The rollers will rotate so as to give the illusion of the movement of the background to the left. If the airplane is in a climbing attitude, the miniature airplane index 4 will be above the horizon; and if a turn is made to the right, the index will bank or tilt in a clockwise direction to indicate that a climbing turn to the right is being made. If the attitude of the aircraft is such that it is descending, the index 4 will move below the horizon line 33; and if a right turn is made, the index 4 will indicate a right-hand diving turn. A similar operation takes place for turns to the left, except that the direction of motion of background appears to move to the right, as above described. The device indicates the true flight attitude during straight flight—i. e., whether the aircraft is flying level, climbing, or descending.

The fact that all of the operating mechanism for causing indicating movement of the miniature airplane index 4 is placed behind the screen assembly 30, makes possible a maximum ratio of the area of the screen to the area of the index and other obstructions, which ratio governs the value of any such instrument in serving as an artificial reference which will relieve the vertigo caused in making turns when flying without the use of external flight references, and in increasing the value of the instrument in visually integrating the sum of the separate indications now given by individual instruments.

Figs. 5 and 6 illustrate a modified form of azimuth-indicating means to replace the endless belt azimuth indicator 57 of the device of Figs. 1 to 4, inclusive. As seen in Fig. 5, the upper-reduced-shouldered portion 34 of one of the rollers 31 is extended through the upper transverse supporting member 11, and is suitably slotted, as at 60, to engage the lower end of a shaft 62 to form the well-known screwdriver type of drive. The shaft 62 drives a conventional counter device 63 having three counterwheels and adapted to indicate all angles in degrees from zero to three hundred sixty degrees. The driving ratio between the roller 31, which drives the counter mechanism and the counter gear train is such that a three hundred sixty degree turn of the aircraft will cause the counter mechanism to indicate the angles from zero to three hundred sixty degrees. Fig. 6 illustrates the arrangement of the counter dials of Fig. 5 so as to be visible through the instrument cover glass.

Fig. 7 illustrates a modified form of screen for use in the device of Figs. 1 to 4 inclusive, in which the rollers 31 are replaced by a pair of large rollers 31a and a pair of small rollers 31b. The rollers 31a are spaced the length of the desired background, while the rollers 31b are centrally disposed, with a small clearance space 32 therebetween, through which the index-actuating shaft 5 may pass. An endless belt 65, made of flexible material, passes over each adjacent pair of rollers 31a and 31b. The pair of screens 65 form an unbroken background, except for the vertical slot, or opening, 32. Each of the rollers 31a is provided with spiral-tooth pinion gears 35, which mesh with the respective worm sections 36a, similar to rollers 31 of the device of Figs. 1 to 4. The worm sections 36a are rotated by the spiral-tooth gear 40 in the same manner as worm 36 (Fig. 1) is actuated. Each of the rollers 31a is provided with sprocket teeth 66, which engage the perforations 67 in the respective belts 65 and serve to positively drive the belts. The belts 65 are each provided with central horizon index lines 33, and the space above the horizon line is painted to imitate sky scenery, while the space below the horizon line is painted to resemble the earth, in the same manner as in the above-noted Crane and Ocker patents. The screen assembly is employed with the remaining structure illustrated in Figs. 1 to 4 inclusive and operates in a similar manner, in that the screens 65 of Fig. 7 cause an illusion of translatory movement of the reference background as a whole. The screen assembly of Fig. 7 permits the actuation of the miniature airplane index 4 in the same manner as the same is actuated in the device of Figs. 1 to 4 inclusive.

Figs. 8 to 11 inclusive illustrate a form of the invention in which an optical means is employed to create the illusion of a translatory movement of the reference screen relative to the miniature airplane index. As seen in Fig. 8, the instrument comprises a casing 70 of rectangular shape closed by a removable cover glass structure 72 and having a partitioned chamber 74 at its rear end, forming a housing for a directional gyro of conventional design and generally indicated by the reference numeral 75. The gyro unit 75 comprises an air turbine type gyro wheel 76 rotatably mounted by means of shaft 77 in the gymbal frame 78, which is pivotally mounted by means of pivots 79 for rotation about a longitudinal axis in the vertical gymbal frame 80. The vertical gymbal frame 80 is pivotally mounted for rotation about a vertical axis by means of a lower pivot extension 81, carried by a ball type bearing 82, formed in the end of a boss 83, which extends from the instrument casing. The upper end of the frame 80 is provided with a spindle 84, which is rotatably mounted in ball bearing 85. Air at atmospheric pressure enters the nozzle 90 by means of the passage 91; and the conduit 92 is connected to a means, such as a vacuum pump or Venturi tube (not shown), which serves to exhaust the chamber 74 and create a pressure difference between the inlet passage 91 and the exhaust conduit 92 sufficient to cause a high velocity jet of air to impinge on the turbine vanes of the gyro wheel 76, rotating the wheel at a high velocity. The gyro wheel 76 when set in motion tends to remain fixed in space in the vertical plane in which it was initially set in motion, and any turning of the aircraft about the axis 81—84 causes the casing 70 to revolve about the vertical gyro frame 80 or to create relative motion between the gyro wheel and its supporting casing. The gyro is caged and set by conventional manual means actuated by the resetting shaft 94, axially movable and rotatable by the resetting knob 95.

The vertical pivot shaft 84 of the gyro frame 80 extends through the upper wall of the chamber 74 and has a conical-shaped mirror 100 rigidly secured thereto and rotatable therewith. The mirror 100 has small colored pieces of irregular shape, 102, inserted therein and small black numerals 103 are arranged in a band around the mirror and serve as an aximuth scale in a manner hereinafter described. A light projector 104 and a reflecting mirror 105 are each mounted on a bracket 106 secured to the instrument casing. The projector 104 and mirror 105 are arranged in the rear of the conical mirror 100 such that light from the projector will strike the surface of mirror 100 and be reflected into the mirror 105, from whence the light is transmitted forward to the ground glass screen 108 supported by the wall 109 in the forward portion of the instrument casing 70. The mirror 104 is made of a curved shape such that the light received from mirror 100 will be reflected as divergent rays illuminating a considerable area of the ground glass screen 108. The colored glass sections of the mirror will reflect colored light to the screen 108, and the colored spots, or patterns, on the screen 108 will make an illuminated background, with sharply defined shades and shadows due to the variation in ilumination in various parts thereof. The image of the numerals on the mirror 100 will also appear on the ground glass screen. As the aircraft on which the instrument is mounted turns—for example, to the right—the instrument casing 70 will rotate about the spindle 84 of the gyroscope 75, and light from the projector 103 will impinge on the colored sections of the mirror 100, causing spots or zones of colored light of a lower intensity to appear on the ground glass screen 108; and the spots of light will appear to move from right to left on the screen 108 and create the illusion of movement of the background relative to the miniature airplane index. The small numerals 102 on the mirror 100 will be transmitted in shadow outline to the screen 108 and serve to indicate the actual number of degrees of the turn and the new azimuth heading of the aircraft.

The miniature aircraft index 110, similar in outline to the airplane index 4 of the device of Fig. 1, is mounted on a horizontal shaft 111, rotatably mounted in a bearing 112, carried by the ground glass screen 108. At its inner end, the shaft 111 has a lever 113 rigidly secured thereto at right angles to the axis of shaft 111; and the lever 113 extends downwardly and passes between the forks 115, extending in a plane at right angles to the plane of a vertical lever 114 and formed as bent-over portions thereof. The lever 114 is fixed on the end of a shaft 116 and is rotatable therewith, the shaft 116 being a pointer snaft of a sensitive electric meter 117, which is connected by electrical connections 118 and 119 to a photoelectric cell 120 of the self-current-generating, or "Photronic" type. The levers 113 and 114 are carefully counterbalanced to eliminate the effects of acceleration forces thereon.

The "Photronic" cell 120 is mounted in the casing 122 of a horizontal gryroscope 123—preferably that of the "automatic pilot"—the gyro wheel being pivotally mounted in gymbal rings 124 and 125, so that the gyro may remain horizontal independent of either pitching or rolling motion of the associated aircraft. A light projector 126 is mounted on a bracket 127, secured to the horizontal gyro casing 122 and arranged to direct a beam of light onto the light-sensitive surface of the "Photronic" cell 120, causing the same to generate a current proportional to the intensity of the light transmitted thereto. A translucent screen 130, in the shape of a spherical segment, is carried by the gyro 123 and arranged so that the optical axis of the screen is perpendicular to the horizontal plane of the gyro 123, the screen being located between the light source, or projector 126, and the "Photronic" cell 120. The translucent screen 130 (see Fig. 10) is made such that the screen gradually becomes more opaque in going from longitudinal zone $a$ to zone $o$, the longitudinally extending zones, however, having a constant density or light-transmitting character throughout their longitudinal length. The line of mean light-transmitting character is arranged to be the line $x-x$, passing longitudinally through the center of the screen. By control of the intensity of the light transmitted by the projector 126, by adjustment of the manually controlled rheostat 129, connected in one of the power supply leads 128, for the lamp in the projector 126, and by initially adjusting the fixed resistance of the conductors 118—119, light passing through the translucent screen 130 will cause "Photronic" cell 120 to generate a current sufficient to deflect the arm or pointer 114 of the sensitive electric meter 117 to the mid point of its motion. The arm 113 will then be vertical, and the miniature airplane index 110 will be horizontal. If the aircraft banks or rolls about its longitudinal axis—for example, the right wing drops—then casing 122 will rotate clockwise about the axis of the gyro gymbal ring 125, and the light from projector 126 will pass from the line $x-x$ (Fig. 10) through a more dense zone, and the intensity of light striking the "Photronic" cell 120 will decrease, causing a decreased current to flow into meter 117 and thus permitting the pointer 114 to move counterclockwise toward its zero position, causing arm 113 to rotate the shaft 111 and the miniature airplane index 110 in a clockwise direction to indicate that the bank or roll is clockwise or that the right wing is down. Similarly, if the airplane banks to the left—i. e., the left wing drops—the light transmitted from the projector 126 to the "Photronic" cell 120 will pass through a less dense zone of the translucent screen 130 so that a greater intensity of light will fall on the "Photronic" cell 120, causing a greater current to pass through the meter 117, in turn causing an increased deflection of the pointer 114, which will cause a counterclockwise rotation of the arm 113, shaft 111, and the miniature airplane index 110, which will then correctly indicate the banked position of the airplane. Because of the fact that all longitudinal lines along the translucent screen 130 are of constant optical density or light-transmitting character throughout their length, pitching motion of the aircraft about the pivotal axis of the gymbal ring 124 will not affect the indication of the meter 117 and index 110.

The translucent shield 130 is supported from the gyro 123 by means of a vertical translucent shield 132, which is interposed between the projector 126 and a "Photronic" cell 134, mounted in a vertical plane in casing 122. The light projector 126 is provided with a second light-directing opening and lens, for directing a beam of light onto the light-sensitive cell 134, in a plane at right angles to the plane of the beam transmitted to cell 120.

As seen in Fig. 11, the vertical translucent shield 132 is divided into parallel arcuate zones which are made with a constant light-transmitting density throughout their length and curved so that light passing through the screen will pass through the same zone, irrespective of rotation of the instrument casing 122 about the axis of rotation of gyro gymbal ring 125. The zones are made of a constantly decreasing light-transmitting character from the upper zone $a'$ to the lower zone $o'$.

Referring again to Fig. 8, when the aircraft is in level flight, light passing through the translucent screen 132 will cause the "Photronic" cell 134 to generate a current proportional to the intensity of the light passing through the screen. If the aircraft should move into a descending, or diving attitude, the casing 122, light projector 126, and "Photronic" cell 134 will rotate in a counterclockwise direction about the pivotal axis of the gymbal ring 124, and light from projector 126 will pass through an optically denser portion of screen 132, allowing light of a diminished intensity to fall on the cell 134, causing a decreased current to be generated thereby. If the aircraft should move from the level flight position into a climbing attitude, light from the projector 126 will pass through a less dense portion of the screen, and the intensity of the light falling on the "Photronic" cell 134 will be increased, causing an increased current to be generated thereby. The variation in current from the cell 134 may be thus made to vary in a manner nearly proportional to the aircraft deviation from the level flight position. Where space permits, the vertical shield 132 may be curved in the vertical plane with the center of curvature at the pivotal axis of the gymbal ring 124; and the shield, or screen 132, in such a case, will be an arcuate extension of the translucent shield, or screen 130. For the purposes of the present instrument, however, the shield 132 may be made straight, as shown, without introducing appreciable errors. The variation in current generated by the "Photronic" cell 134 in response to changes in attitude about the pitching axis of the aircraft, is utilized to actuate a horizon-reference indicator in the following manner:

The "Photronic" cell 134 is connected by conductors 135 and 136 to a sensitive electric meter 138 having a double end pointer shaft 139, to each end of which is secured a counterweighted pointer arm 140 (see Fig. 9). The meter 138 is similar to the meter 117 and is mounted in the instrument casing 70 such that the pointer shaft 139 is transverse of the casing and in the same horizontal plane as the index-actuating shaft 111. As particularly seen in Fig. 9, the pointer arms 140 are made of very thin lightweight material, and each pointer arm extends forward and passes through slots 142 in the wall 109 adjacent the outer edges of the ground glass screen 108, and at their outer ends the pointer arms are each provided with a bent-over portion 141, which extends across the ground glass screen 108 nearly to the index-actuating shaft 111. The bent-over portions 141 of the pointer arms 140 are painted black with luminous edges, so that the bent-over portions serve as a horizon index, similar to the horizon bar in the above-noted Crane and Ocker patents. By inserting a suitable ballast resistance (not shown) in circuit with the "Photronic" cell 134, the current value may be adjusted so that when the aircraft is in the level flight position, the shaft 139 of the meter 138 will be deflected in a clockwise direction, as seen in Fig. 8, to the mid point of its range, at which time the pointer arms 140 will be horizontal and in the same plane as the index-actuating shaft 111. If the aircraft assumes a diving attitude, the cell 134 will generate a diminished current and cause a decrease in the deflection of the shaft 139 of meter 138, causing the pointer arms 140 and the horizon bars 141 to move up an amount nearly proportional to the deviation of the aircraft and indicate, by the relative positions of the horizon bars 141 and the miniature airplane index 110, that the aircraft is in the diving position. Similarly, if the aircraft moves into a climbing attitude, the greater current generated by the cell 138 will cause an increased deflection in a clockwise direction of the shaft 139 and pointer arms 140, causing the horizon bars 141 to move below the miniature airplane index 110 and indicate that the aircraft is climbing.

While the translucent screens 130 and 132 have been described as having zones with varying light-transmitting character, it is to be understood that these zones may be of infinitesimal width, so that the variation in optical density from one extreme zone to the other will be uniform, though for practical purposes it is preferred to make the translucent shields from narrow strips, each having a different optical density.

*Operation*

The device operates in a manner similar to the device of Figs. 1 to 4 inclusive, in that the miniature airplane index 110 correctly indicates the bank or level flight condition of the airplane, while the horizon bars 141 correctly indicate whether or not the aircraft is climbing, descending, or maintaining level flight, by the movement of the horizon bar above, below, or in alignment, respectively, with the horizontal plane passing through the index-actuating shaft 111. The directional gyro unit 75, in combination with the optical transmission, comprising light projector 104, mirrors 100 and 105, and ground glass screen 108, serves to indicate the existence of a turn by creating the optical illusion of a translatory motion of the background furnished by the illuminated ground glass screen 108 past the miniature airplane index 110 in a direction opposite the direction of turn, thus correctly visually simulating the visual stimulus received by the pilot of an aircraft when making a turn using the background of the sky, earth, and horizon as a reference. The indication of the magnitude of the turn is in the manner previously described.

The novel photoelectric method of transmitting indications of the aircraft's change in position to the flight indicator, permits the use of present existing change-in-position-responsive instruments, as transmitting units, without imposing any load on such instruments or devices.

In medium-sized and large aircraft, which are generally equipped with the gyroscopically controlled "automatic pilot," the various gyro units thereof may serve as an excellent means for transmitting change in aircraft position indications to the flight indicator. It is to be noted however that the instrument may incorporate all of the various devices necessary for its actuation as units thereof, and a rate-of-climb indicator may obviously be used as a means to control the indication of climb, descent, or level flight attitudes of the aircraft as given by the flight indicator.

While the device illustrated in Figs. 8 to 11, inclusive, employs a reflecting optical system to create the optical illusion of a translatory motion of the reference background screen relative to the airplane index, it is apparent that the mirror 100 may be replaced by a translucent screen operatively connected to the directional gyroscope 75 and having a pictorial colored or variable optical density pattern thereon, including opaque azimuth indicia. The translucent screen may be arranged to be interposed between the light projector 126 and the screen 108, and either rotated or given a translatory motion relative to the screen 108 to cause the optical illusion of motion of the screen 108, as well as to transmit the azimuth indicia thereon, such an arrangement employing the familiar motion picture system of projection.

While preferred forms of the invention have been illustrated, other modifications falling within the scope of the invention as defined by the appended claims, will become apparent to those skilled in the art.

I claim:

1. A flight indicator for aircraft, comprising an instrument casing; a background screen disposed within said casing and comprising at least two sections movable in translation and centrally spaced apart to form a vertically extending aperture in the screen; a miniature airplane index mounted in front of said screen; a shaft on which said index is mounted, said shaft projecting through the aperture in said screen; means responsive to lateral inclination of an associated aircraft operatively connected to said shaft behind said background screen for causing rotation of said shaft and a corresponding tilting of said index indicative of the lateral inclination of the associated aircraft; and means responsive to turning of the associated aircraft operatively connected to said screen sections to cause a motion thereof creating an optical illusion of translatory motion of said background screen across the entire field of view relative to said index in a direction opposite the direction of turning of the associated aircraft.

2. The structure as claimed in claim 1, in which said background screen comprises a plurality of parallel vertically disposed rollers, a central pair of said rollers being spaced sufficient for the passage of said index-actuating shaft therebetween, and means for simultaneously rotating said rollers about their respective axes actuated by said means responsive to turning of the associated aircraft.

3. The structure as claimed in claim 1, including a horizon reference line and a means located behind said screen and responsive to pitching inclination of said associated aircraft for causing vertical displacement of said miniature airplane index above or below said horizon reference line indicative of the pitching deviation of said associated aircraft from a horizontal plane.

4. In a flight indicator having a reference screen with a vertically disposed aperture therein and a horizon index cooperating with said screen; a rotatable shaft extending through said aperture, a miniature airplane index mounted on said shaft, said airplane index being visible relative to said screen and horizon index; slidable means providing a journal bearing for rotatably mounting said shaft, means responsive to pitching movement during flight for actuating said slidable means for causing vertical displacement of said shaft and airplane index above and below said horizon index, driving means for rotating said shaft in either direction irrespective of the movement of said slidable means; and means responsive to lateral inclination during flight for actuating said driving means to cause a rotation of said shaft and tilting of said airplane index to indicate aircraft bank; each of the means for respectively causing vertical displacement and tilting of said airplane index relative to said horizon index being adapted to act severally or simultaneously and being positioned behind said reference screen.

5. The structure as claimed in claim 4, in which said reference screen comprises a plurality of vertically disposed rollers, each having a zone of contrasting color above and below said horizon index, a pair of said rollers being spaced for the passage of said airplane-index-actuating shaft therebetween, and means responsive to turning during flight for simultaneously rotating each of said rollers about its longitudinal axis an amount and at a rate proportional to the amount and rate of turning.

6. The structure as claimed in claim 4, in which said reference screen comprises a pair of endless belts, each having one face thereof forming a part of said screen and the adjacent ends of said belts being spaced apart to allow said airplane-index-actuating shaft to extend therebetween so as to be capable of free rotary movement and vertical displacement; and a means responsive to turning during flight for causing a simultaneous motion of said belts across the field of view relative to said airplane index so that the direction of relative motion is to the left for a right turn and vice versa for a turn to the left.

7. A bank and turn indicator for aircraft, comprising a translucent reference screen having an aperture therein, a horizon index cooperating with said screen to divide the view of the same into sections representing the view of the earth and sky, a rotatable shaft extending through the aperture in said screen, a miniature airplane index mounted on said shaft in front of said screen and tiltably thereby with respect to said horizon line to indicate the lateral inclination during flight, an inclinometer operatively connected to said shaft behind said reference screen to actuate the same, a turn indicator operative to indicate the direction and magnitude of the change of azimuth during a turn, a source of light for illuminating the screen, a movable means interposed in the path of transmission of light from said light source to said screen operative in any one position to vary the illumination of said screen to form contrasting illuminated zones thereon, and an operative connection between said movable means and said turn indicator whereby said movable means causes a moving light pattern across said screen having a motion in a direction opposite the direction of turning.

CARL J. CRANE.